(12) United States Patent
Schöllin

(10) Patent No.: US 6,823,769 B2
(45) Date of Patent: Nov. 30, 2004

(54) DEVICE AND METHOD FOR FIXING A PISTON OR A PISTON ROD ATTACHMENT TO A PISTON ROD

(75) Inventor: Jan-Ove Schöllin, Kumla (SE)

(73) Assignee: Volvo Wheel Loaders AB, Eskilstuna (SE)

( * ) Notice: Subject to any disclaimer, the term of this patent is extended or adjusted under 35 U.S.C. 154(b) by 0 days.

(21) Appl. No.: 10/248,419

(22) Filed: Jan. 17, 2003

(65) Prior Publication Data

US 2003/0140784 A1 Jul. 31, 2003

Related U.S. Application Data

(63) Continuation of application No. PCT/SE01/01513, filed on Jun. 29, 2001.

(30) Foreign Application Priority Data

Jul. 18, 2000 (SE) ................................................ 0002709

(51) Int. Cl.[7] ................................................ F16J 1/00
(52) U.S. Cl. ................................................ 92/255
(58) Field of Search ........................... 92/255; 403/294, 403/292

(56) References Cited

U.S. PATENT DOCUMENTS 1,440,801 A * 1/1923 Shoemaker .............. 403/379.3
3,650,182 A   3/1972 Phillips .................... 92/128
5,904,440 A   5/1999 Sims ....................... 403/316

FOREIGN PATENT DOCUMENTS

WO    WO 9701035 A1   1/1997

* cited by examiner

Primary Examiner—Edward K. Look
Assistant Examiner—Michael Leslie
(74) Attorney, Agent, or Firm—Novak Druce LLP

(57) ABSTRACT

Method and arrangement for fixing a piston (1), or a piston rod attachment, to a piston rod (5), one of the piston (1) and the piston rod (5) having a hole (2) running in its axial direction, and the other of these having a portion designed for being received by the hole (2) for connection of the piston (1) and the piston rod (5). The device includes an elongate locking means (10), at least one first opening (8a, 8b) in the piston and at least one second opening (9) in the piston rod (5), which openings (8a, 8b, 9) in the piston rod (5), which openings (8a, 8b, 9) extend in a different direction from the axial direction and are designed for receiving the locking means (10) for the purpose of bringing about the fixing. The elongate locking means (10) has a greater extent in its transverse direction, along at least a part of the means, than the extent of at least one of the openings (8a, 8b, 9) in its transverse direction, along at least a part thereof, for form locking between the locking means (10) and the opening. The invention also relates to a method for the fixing.

19 Claims, 2 Drawing Sheets

DEVICE AND METHOD FOR FIXING A PISTON OR A PISTON ROD ATTACHMENT TO A PISTON ROD

CROSS REFERENCE TO RELATED APPLICATIONS

This application is a continuation patent application of International Application No. PCT/SE01/01513, filed 29 Jun. 2001 which was published in English pursuant to Article 21(2) of the Patent Cooperation Treaty, and which claims priority to Swedish Application No. 0002709-4, filed 18 Jul. 2000. Both applications are expressly incorporated herein by reference in their entireties.

BACKGROUND OF INVENTION

1. Field of the Invention

The present invention relates to an arrangement or device for fixing a piston, or a piston rod attachment to a piston rod. The inventive configuration includes one of these three members to have a hole running in its axial direction and the other of the joining components having a portion configured to be received by the hole for effecting connection of the piston or the piston rod attachment and the piston rod. The actual connective device or arrangement includes an elongate locking means or member, at least one first opening in the piston or the piston rod attachment and at least one second opening in the piston rod. These openings extend in a different direction from the axial direction and are designed for receiving the locking means or member for the purpose of bringing about fixation. The invention can, for example, be applied to both hydraulic and pneumatic cylinders. The invention also relates to a method for establishing the fixation.

2. Background

The specification of U.S. Pat. No. 6,032,569 describes a device for fixing a piston to a piston rod. The piston is provided with a threaded axial through-hole intended for receiving a corresponding externally threaded portion of the piston rod. The piston is also provided with a portion of reduced diameter through which the hole extends. This narrower portion is provided with a number of radial through-openings that open into a groove extending in the circumferential direction. The piston rod is, close to its end, provided with a number of axially running grooves. For fixing the piston on the piston rod, the piston rod is screwed into the piston in such a manner that one of the openings coincides with one of the axial grooves. The device also includes a locking clamp which is, in principle, C-shaped. One end portion of the clamp projects from one end of the C-shape essentially in the direction toward the other end of the clamp. The locking clamp also has such resilient properties that the ends of the clamp can be positioned at different spacings relative to each other. When the piston has been screwed to the intended location on the piston rod, the locking clamp is clamped firmly in such a manner that the end portion of the clamp passes through the opening in the narrower portion of the piston and down into the groove of the piston rod. The clamp is thus clamped firmly in the groove running in the circumferential direction around the portion of reduced diameter. In this way, the piston is rotationally fixed relative to the piston rod.

SUMMARY OF INVENTION

A first object of the invention is to produce a construction that is simple and cost-effective, in terms of production, for fixing a piston or a piston rod attachment to a piston rod.

This object is achieved by virtue of the elongate locking means or arrangement having a greater extent in its transverse direction, along at least a part thereof, than the extent of at least one of the openings in its transverse direction, along at least a part thereof, for form locking between the locking means and the opening. Only a simple tool, for example a hammer, is needed for putting the locking means in place. With this type of construction, a strong fixing device, which is possible to assemble rapidly and easily, is obtained at a low production cost.

According to a preferred embodiment, the piston or the piston rod attachment is provided with the hole that is at least partly threaded. The piston rod is configured so that the portion intended for being received in the hole of the piston includes a threaded portion corresponding to the threadings of the hole of the member to be joined thereto. This connection type is reliable and cost-effective from a manufacturing point of view.

According to another preferred embodiment, the first opening has a longitudinal extent at least essentially at right angles to the axial direction of the piston or the piston rod attachment and is also open in the axial direction thereof. In other words, the first opening consists of a slot or a groove, and is therefore open in the axial direction of the piston or the piston rod attachment. Such an opening can be produced in a number of different ways, inter alia, by casting or by milling which allows scope for simplified and thus cost effective manufacture.

According to another preferred embodiment, the piston or piston rod attachment has a portion of reduced diameter projecting in its axial direction, and the first opening extends through this portion. The piston or the piston rod attachment also has at least one set of two of the first openings, which extend through the body of the projecting portion, and the longitudinal direction of which extends along an at least essentially straight line. Opportunities are thus afforded for fixing the locking means at two points on the piston or the piston rod attachment, which provides increased functional reliability.

According to another preferred embodiment, at least one of the piston or the piston rod attachment and the piston rod includes a shoulder intended for interaction with a portion of corresponding design of the other of the piston or the piston rod attachment and the piston rod for the purpose of limiting the axial movement of the piston rod relative to the piston or the piston rod attachment. By virtue of, during connection of the piston or the piston rod attachment and the piston rod, first bringing these together so that the shoulder is brought into contact, and then moving the piston or the piston rod attachment relative to the piston rod in another direction so that the shoulder no longer makes contact and in this position making the first and second openings coincide and inserting the locking means into these openings, the axial forces which arise when the piston works in the cylinder will be taken up by the threads of the piston and/or the piston rod attachment and the piston rod and not by the locking means. This reduces the risk of fatigue damage.

Another object of the invention is to bring about a method for fixing a piston or a piston rod attachment to a piston rod that allows simplified mounting in relation to the known art. A further object of the invention is to bring about a method for fixing a piston rod attachment to a piston rod which affords opportunities for cost-effective manufacture of the parts necessary for fixing.

Further advantages and advantageous embodiments of the invention emerge from the description below and the patent claims.

BRIEF DESCRIPTION OF DRAWINGS

The invention is described in greater detail below, with reference to the embodiment shown in the accompanying drawings.

DETAILED DESCRIPTION

Figure 1:
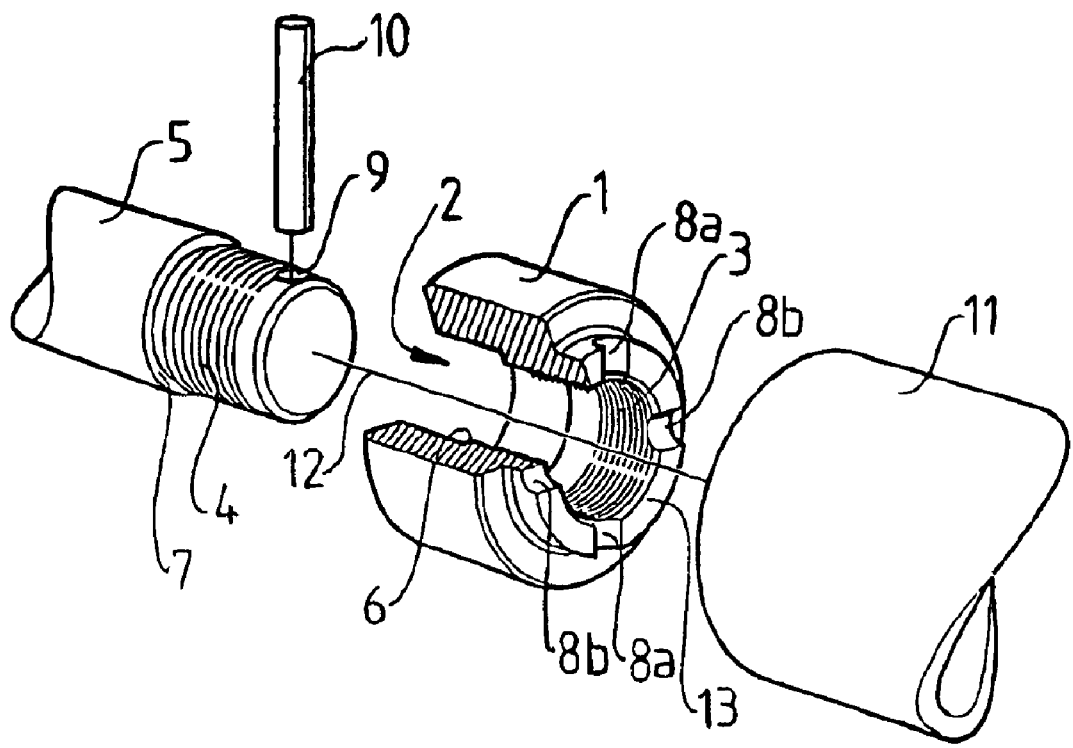
FIG. 1 is a partial cut-away, partial sectional perspective view of device configured according to the invention for fixing a piston to a piston rod in the unfixed state.

FIG. 1 illustrates a piston 1 with a through-hole 2 in the axial direction. The hole 2 is provided with a threaded portion 3 intended for receiving a correspondingly threaded portion 4 of a piston rod 5. The piston 1 is provided with a shoulder 6, and the piston rod 5 is provided with a corresponding shoulder 7, the purpose of which is to limit the axial movement of the piston rod relative to the piston during connection of the two together. The piston 1 is also provided with two sets of two first openings 8a, 8b, which openings extend essentially at right angles to the axial direction 12 of the piston and are open in the axial direction of the piston 1. The two openings 8a, 8b in each of the sets have a longitudinal direction that extends along an at least essentially straight line. The piston rod 5 is provided with a second opening 9 which extends essentially at right angles to the axial direction 12 of the piston rod and is a through-opening.

FIG. 1 also shows a cylindrical locking member or means that, as described below, is intended to be fitted after the piston 1 has been connected to the piston rod 5. The essentially cylindrical design of the locking means 10 makes simple and cost-effective production possible. In order to make form locking possible, the locking means 10 has a slightly greater diameter than the second opening 9. As the second opening 9 is a through-opening, removal of the locking means 10 is facilitated. This is an advantage during, for example, maintenance work. With the second opening in the piston rod being a through-opening, a locking means of a length roughly corresponding to the reduced diameter of the projecting portion of the piston can be used. Owing to the fact that the length over which locking is effected corresponds roughly to the reduced diameter of the piston, centering of the locking means in the radial direction of the piston is not critical as there is no risk of the locking means wearing against the inner surfaces of the cylinder on account of slight miscentering.

For the sake of completeness, a cylinder 11, in which the piston 1 is intended to perform its work, is also shown in FIG. 1.

The piston 1 includes a portion 13 of reducing diameter projecting in its axial direction, to which portion the first openings 8a, 8b are assigned. The hole 2 also extends through this portion of reduced diameter. Machining of that surface of the piston 1 which comes into contact with the inner surface of the cylinder 11 during work is thus avoided. Moreover, there is no risk that the locking means 10 will wear against the inner surfaces of the cylinder on account of a slight miscentering of the locking means 10 in the radial direction of the piston.

The method for fixing the piston 1 to the piston rod 5 is performed by these first being interconnected via a relative movement in the axial direction 12, their threaded portions 3, 4 interacting with one another. To be precise, the piston rod 5 is screwed into the piston 1 until the shoulders 6, 7 are brought into contact with one another. The piston 1 and the piston rod 5 are then moved away from one another via an opposite relative movement until one of the sets of the first openings 8a or 8b coincides with the second opening 9, after which the locking means 10 is brought down into the first and second openings 8a, 9 or 8b, 9. The piston 1 and the piston rod 5 are then fixed and thus prevented from moving axially or rotating relative to one another. The component parts 1, 5, 10 required for performing the method can be manufactured in a cost-effective manner, and no form of finishing is therefore necessary. This makes the method rapid and simple.

As described above, use is made of only one of the two sets of the first openings 8a, 8b when the piston 1 is fixed to the piston rod 5. A sealing position between the piston 1 and the piston rod 5 requires a certain axial positioning tolerance. A number of sets of openings 8a, 8b leads to greater accuracy in axial positioning. No torque tightening is required either. It lies within the scope of the following patent claims of course that the piston 1 be provided with a different number of the sets of openings 8a, 8b. Three and four sets are mentioned here by way of example.

Figure 2:
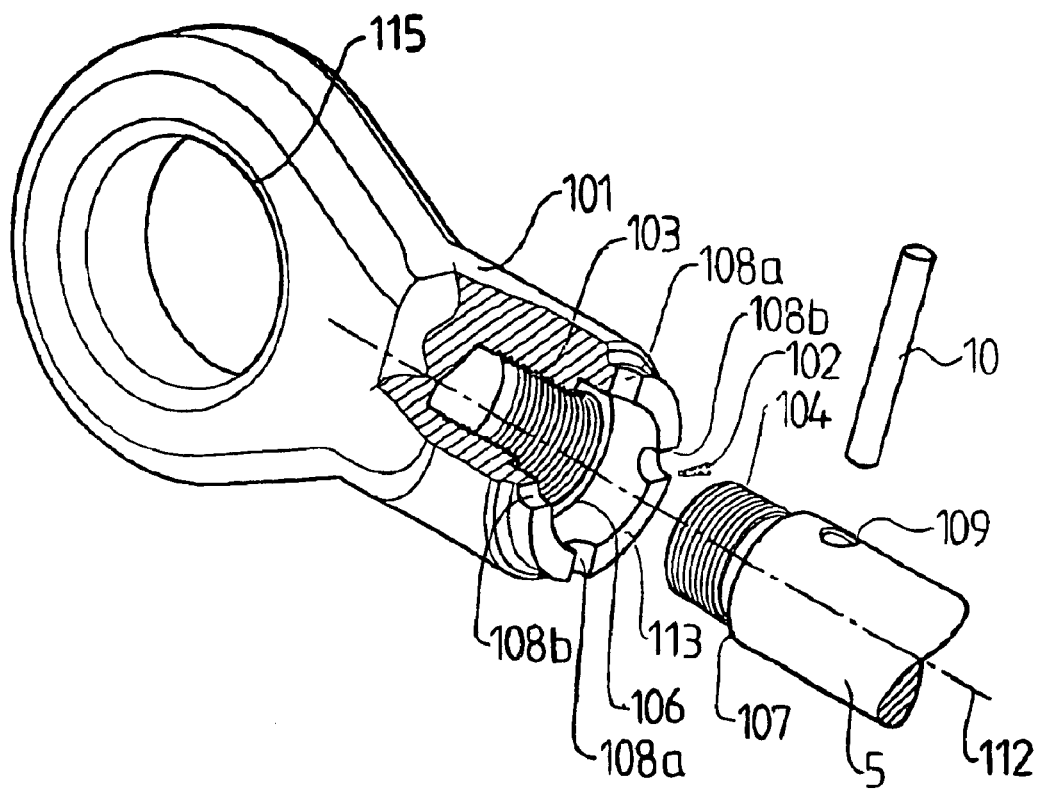
FIG. 2 is a partial cut-away, partial sectional perspective view of a device configured according to the invention for fixing a piston rod attachment to a piston rod in the unfixed state.

FIG. 2 illustrates a piston rod attachment 101, here in the form of a piston rod lug with a through-hole 115 for receiving a pivot pin or the like. The piston rod attachment 101 includes a hole 102 running in its axial direction. The hole 102 has a bottom and is provided with a threaded portion 103 intended for receiving a corresponding threaded portion 104 of the piston rod 5. It should be appreciated that both the piston rod attachment 101 of FIG. 2 and the piston 1 of FIG. 1 are alike in that they are each members that can be coupled to the piston rod 5, and are therefore each referred to as coupleable members.

The piston rod attachment 101 is provided with a shoulder 106, and the piston rod 5 is provided with a corresponding shoulder 107, the purpose of which shoulders is to limit the axial movement of the piston rod relative to the piston rod attachment 101 during their interconnection. The shoulder 106 of the piston rod attachment 101 is provided in the hole 102.

The piston rod attachment 101 is also provided with two sets of two first openings 108a, 108b, which openings extend essentially at right angles to the axial direction 112 of the piston rod attachment 101 and are open in the axial direction thereof. The two openings 108a, 108b in each of the sets have a longitudinal direction that extends along an at least essentially straight line. The extending piston rod 5 is provided with a second opening 109 that extends essentially at right angles to the axial direction 112 of the piston rod and is a through-opening.

In order to make form locking possible, the locking means 10 has a slightly greater diameter than the second opening 109. As the second opening 109 is a through-opening, removal of the locking means 10 is facilitated, which is an advantage during, for example, maintenance work.

The piston rod attachment 101 has a portion 113 of reduced diameter projecting in its axial direction, to which portion the first openings 108a, 108b are assigned. The hole 102 also extends through this portion of reduced diameter.

The method for fixing the piston rod attachment 101 to the piston rod 5 is performed in a similar manner to that described above for connection of the piston 1 to the piston rod 5. This is carried out by these members being first interconnected via relative movement in the axial direction 112 via their threaded portions 103, 104 interacting with one another. To be precise, the piston rod 5 is screwed into the piston rod attachment 101 until the shoulders 106, 107 are brought into contact with one another. The piston rod attachment 101 and the piston rod 5 are then moved away from one another via an opposite relative movement until one of the sets of the first openings 108a or 108b coincides with the second opening 9. The locking means 10 is then brought down into the first and second openings 108a, 109 or 108b, 109. The piston rod attachment 101 and the piston rod 5 are then fixed thus prevented from moving axially or rotating relative to one another. The component parts 101, 5, 10 required for performing the method can be manufactured in a cost-effective manner, and no form of finishing is therefore necessary. This makes the method rapid and simple.

As described above, use is made of only one of the two sets of the first openings 108a, 108b when the piston rod attachment 1 is fixed to the piston rod 5. A sealing position between the piston rod attachment 101 and the piston rod 5 requires a certain axial positioning tolerance. A number of set of openings 108a, 108b leads to greater accuracy in axial positioning. No torque tightening is required either. It lies within the scope of the following patent claims of course that the piston rod attachment 101 be provided with a different number of the sets of openings 108a, 108b. Three and four sets are mentioned here by way of example.

The embodiment described is to be regarded only as a preferred example, and a number of further variants and modifications are possible within the scope of following patent claims. For example, the shoulder 6; 106 can consist of the outer delimiting surface of the piston 1, or the piston rod attachment 101, in the axial direction, which faces the piston rod 5. Furthermore, the openings 8a, 8b; 108a, 108b in the piston 1 or, respectively, the piston rod attachment 101, can consist of holes in its wall, which means that they are no longer open in the axial direction of the piston.

As far as the locking means 10 is concerned, it does not necessarily have to be cylindrical or be of the length illustrated in FIGS. 1 and 2. Other shapes, such as one of polygonal cross-sectional shape, are also possible. As mentioned above, the form locking is not tied to the opening 9; 109. In other words, the first opening 8; 108 and/or the second opening 9; 109 can be adapted for form locking, or an interference fit as it is sometimes known, of the locking means 10. It is also possible to conceive of using two or more locking means.

The locking means 10 can also, for example, have a conical shape, be cambered (that is to say, having a bulging portion), or include an indentation or a notch. The indented portion in such a locking means would be intended to be compressed slightly during fitting and to exert pressure outwardly in the radial direction against the wall of the opening. The locking means 10 can also be referred to as a dowel or locking pin.

Likewise, the invention is not limited to the openings 8a, 8b, 9; 108a, 108b, 109 having a circular or part-circular cross-sectional shape either, but they can have, for example, a polygonal cross-sectional shape. One or more of them can also have a rounded shape in its or their longitudinal direction. One or more of the openings can also have the shape of a cone or a truncated cone.

According to another alternative, the hole 2 in the piston 1 does not have to be a through-hole, but instead can comprise a bottom. In such an alternative, the shoulders 6, 7 can consist of, for example, the end surface of the piston rod 5 and the bottom in the hole 2.

According to a further alternative, it is possible to conceive of a reversed construction relative to FIGS. 1 and/or 2 in which the piston rod 5, instead of the piston 1 (or the attachment 101) is provided with a hole 2; 102 intended for receiving a projecting portion of the piston 1 or the piston rod attachment 101.

The threaded portion 3, 4; 103, 104 of the piston 1, or the piston rod attachment 101, and, respectively, the piston rod 5, is preferably roll-pressed and consists of what is known as a rolled thread. The screwed joint can thus take up great axial loads, the value and direction of which can change frequently.

The solution according to the invention is not, however, limited to such a rolled thread, but also includes other threads, such as a cut thread.

In the embodiment shown in FIG. 1, the threading of the hole 2 is assigned to that area of the hole 2 which extends through the projecting portion 13 of the piston. According to an alternative embodiment, the threading is assigned to an inner area of the hole thus not to that part of the hole 2 which extends through the projecting portion 13.

What is claimed is:

1. A releasable coupling arrangement configured for fixing a coupleable member to a piston rod, the arrangement comprising:
   one of a coupleable member and a piston rod having a hole running in an axial direction thereof and the other having a portion configured for being received by the hole for interconnection of the coupleable member and the piston rod;
   an elongate locking member and a first opening in the coupleable member and a second opening in the piston rod, each opening extending in a direction different from the axial direction and, each opening being configured for receiving the locking member for the purpose of bringing about fixation between the coupleable member and the piston rod; and
   the elongate locking member having a greater exterior dimension in a direction transverse to the axial direction along at least a part thereof than at least one of the first and second openings in an aligned direction for effecting form locking between the locking member and the opening and wherein the hole in the coupleable member is at least partly threaded, and the coupleable member is provided with the portion intended for being received in the hole of the piston, and this portion further includes a threading corresponding to the threading of the hole and wherein the threaded hole of the coupleable member extends at least partly through said projecting portion.

2. A releasable coupling arrangement configured for fixing a coupleable member to a piston rod, the arrangement comprising:
   one of a coupleable member and a piston rod having a hole running in an axial direction thereof and the other having a portion configured for being received by the hole for interconnection of the coupleable member and the piston rod;
   an elongate locking member and a first opening in the coupleable member and a second opening in the piston rod, each opening extending in a direction different from the axial direction and, each opening being configured for receiving the locking member for the purpose of bringing about fixation between the coupleable member and the piston rod; and
   the elongate locking member having a greater exterior dimension in a direction transverse to the axial direction along at least a part thereof than at least one of the first and second openings in an aligned direction for effecting form locking between the locking member and the opening and wherein the first opening has a longitudinal extent oriented essentially at right angles to the axial direction of the coupleable member and is open in the axial direction thereof.

3. A releasable coupling arrangement configured for fixing a coupleable member to a piston rod, the arrangement comprising:
   one of a coupleable member and a piston rod having a hole running in an axial direction thereof and the other having a portion configured for being received by the hole for interconnection of the coupleable member and the piston rod;
   an elongate locking member and a first opening in the coupleable member and a second opening in the piston rod, each opening extending in a direction different from the axial direction and, each opening being configured for receiving the locking member for the purpose of bringing about fixation between the coupleable member and the piston rod; and
   the elongate locking member having a greater exterior dimension in a direction transverse to the axial direction along at least a part thereof than at least one of the first and second openings in an aligned direction for effecting form locking between the locking member and the opening and wherein the first opening has a longitudinal extent oriented essentially at right angles to the axial direction of the coupleable member and is open in the axial direction thereof and wherein the coupleable member further comprises a portion of reduced diameter projecting in its axial direction, and the first opening extends through this portion.

4. The arrangement as recited in claim 3, wherein the coupleable member comprises at least one set of two of said first openings, which extend through the body of the projecting portion, and the longitudinal direction of which extends along an at least essentially straight line.

5. The arrangement as recited in claim 1, 2, 3, or 4, wherein the second opening is configured with a longitudinal direction at essentially right angles to the axial direction of the piston rod.

6. The arrangement as recited in claim 1, 2, 3, or 4, wherein one of the coupleable member and the piston rod has a shoulder intended for interaction with a portion of a corresponding configuration of the other for the purpose of limiting axial movement of the piston rod relative to the coupleable member.

7. The arrangement as recited in claim 1, 2, 3, or 4, wherein the locking member has an essentially constant cross-sectional shape in its longitudinal direction.

8. The arrangement as recited in claim 1, 2, 3, or 4, wherein the locking member extends along an essentially straight line.

9. The device as claimed in any one of claim 1, 2, 3, or 4, characterized in that at least one of said openings has an at least essentially constant cross-sectional shape in a longitudinal direction thereof.

10. The arrangement as recited in claim 1, 2, 3, or 4, wherein the piston is configured for interaction with a hydraulic cylinder.

11. A method for fixing a piston or a piston rod attachment to a piston rod, at least one first opening being formed in the piston or the piston rod attachment and at least one second opening being formed in the piston rod in such a manner that their longitudinal directions differ from the axial direction of the piston or the piston rod attachment and, respectively, the piston rod, the openings being designed for receiving an elongate locking means for the purpose of bringing about the fixing, and the piston or the piston rod attachment being connected to the piston rod via a relative movement between these in their axial direction, the elongate locking means has a greater extent in its transverse direction, along at least a part of the means, than the extent of at least one of the openings in its transverse direction, along at least a part thereof, and in that the locking means is brought down into the openings for form locking between the locking means and the opening after the relative movement and wherein the first opening of the piston or the piston rod attachment is formed in such a manner that it has longitudinal extent essentially at right angles to the axial direction of the piston or the piston rod attachment, and in that it is also open in the axial direction thereof.

12. The method as recited in claim 11, wherein the piston or the piston rod attachment is formed with a portion of reduced diameter projecting in its axial direction, and in that the first opening is formed through this portion.

13. The method as recited in claim 12, wherein at least one set of two of the first openings is formed through the body of the projecting portion in such a manner that their longitudinal direction extends along an at least essentially straight line.

14. The method as recited in claim 11, wherein after the shoulder has been brought into the contact, the piston or the piston rod attachment is moved relative to the piston rod in a different direction, opposite to the first direction, until the openings coincide, after which the locking means is brought down into the openings.

15. The method as recited in claim 11, wherein the first and second openings are formed in the piston or the piston rod attachment, and, respectively, the piston rod before the piston or the piston rod attachment and the piston rod are interconnected.

16. A coupling arrangement configured for fixing a coupleable member to a piston rod that is configured for utilization in an hydraulic piston-cylinder combination, the arrangement comprising:
   one of a coupleable member and a piston rod having a hole running in an axial direction thereof and the other having a portion configured for being received by the hole for interconnection of the coupleable member and the piston rod;
   the coupleable member having multiple sets of paired first openings, each set of paired first openings being alignable with a through opening in the piston rod, one pair at a time; and
   an elongate locking member insertible in an aligned set of paired first openings of the coupleable member and the through opening in the piston rod, and depending on which set of paired first openings of the coupleable member the through opening in the piston rod is aligned, the relative positioning of the coupleable member to the piston rod will be determined.

17. The arrangement as recited in claim 16, wherein a piston associated with piston rod is configured for operation within an hydraulic cylinder.

18. The arrangement as recited in claim 16, wherein said elongate locking member is cylindrically shaped, and said elongate locking member is sized to institute a substantially uniform circumferential interference fit within the through opening in the piston rod when inserted therein.

19. The arrangement as recited in claim 16, wherein said elongate locking member is cylindrically shaped, and said elongate locking member is sized to institute a substantially uniform circumferential interference fit within the aligned set of paired first openings of the coupleable member when inserted therein.

* * * * *